March 2, 1926.  
K. KUEHN ET AL  
FISHING BOBBER  
Filed July 23, 1925

1,575,216

Inventors:  
Kurt Kuehn  
Otto Ribbeck  
By

Patented Mar. 2, 1926.

1,575,216

UNITED STATES PATENT OFFICE.

KURT KUEHN AND OTTO RIBBECK, OF MANITOWOC, WISCONSIN.

FISHING BOBBER.

Application filed July 23, 1925. Serial No. 45,613.

*To all whom it may concern:*

Be it known that we, KURT KUEHN and OTTO RIBBECK, both citizens of the United States, and residents of Manitowoc, in the county of Manitowoc and State of Wisconsin, have invented certain new and useful Improvements in Fishing Bobbers; and we do hereby declare that the following is a full, clear, and exact description thereof.

This invention relates to bobbers for fish lines.

Objects of this invention are to provide a novel form of bobber which is quickly detachable or adjustable upon the line, which holds the line securely, which is water tight, and which may be very cheaply made of pressed metal.

An embodiment of the invention is shown in the accompanying drawing, in which:—

Figure 1:
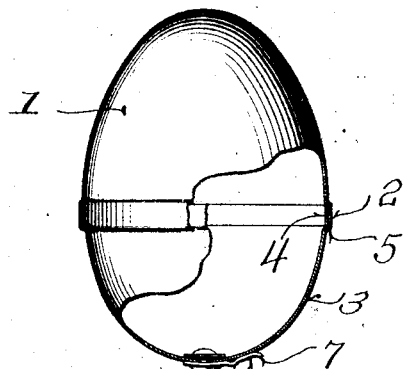
Figure 1 is an elevation partly in section of the bobber.
Figure 2:
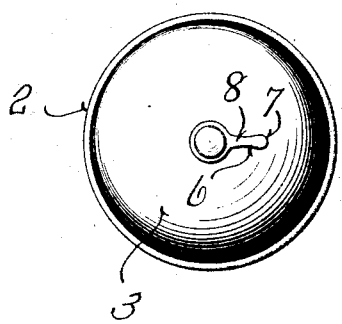
Figure 2 is a bottom view thereof.

Referring to the drawings, it will be seen that the bobber consists of two pressed metal shells which may be of any desirable material of non-rusting characteristics, such as aluminum.

The bobber is formed by making one of the shells 1 with an outwardly projecting flange 2 and forming the lower shell 3 with a corresponding outwardly projecting flange 4, which fits within the flange 2. After the flanges have been fitted together, the bottom edge of the flange 2 is spun or pressed inwardly, as shown at 5 in Figure 1, to thus lock the parts rigidly together.

By means of this construction, the assembling of the device is greatly facilitated and the correct positioning of the parts is insured. In order to hold the line, a spring clip 6 is secured by means of a rivet or other means to the lower shell 3. This spring clip has an upturned outer end 7 to facilitate the insertion of the line between the clip and the shell. It is provided with a recessed or deflected portion 8 which is adapted to receive the line and retain it in position.

It is, of course, intended that the bobber be enameled or otherwise coated to give it a distinctive appearance in addition to that due to its shape.

With this type of bobber the line may be very quickly snapped between the clip and the shell and held in place. No knotting or winding of the line is required nor is there any manipulation of wedging plugs or other securing means of this type necessitated by this construction.

It will be seen that a bobber has been provided which may be formed wholly of metal, which is very light and which is quickly attached and detached from the line.

Further, it will be seen that due to the peculiar manner in which the bobber is formed, that a water tight construction is easily attained.

Although the invention has been described in considerable detail, it is to be understood that the invention may be variously embodied and is, therefore, to be limited only as claimed.

We claim:

1. A bobber comprising a hollow metallic member of oval shape, said bobber having a spring clip secured to its lower end and adapted to receive a line between such clip and the body of said bobber and having an outwardly turned outer end and having a recess intermediate its ends.

2. A bobber for a fish line comprising a pair of stamped metal members which, together, form an oval, one of said members having an outwardly deflected flange, the other of said members having a similar outwardly deflecting flange adapted to fit over said first mentioned flange and having an overhanging portion spun inwardly over the edge of said first mentioned flange, and a spring clip secured to the lower end of said bobber and adapted to frictionally hold a line against said bobber.

In testimony that we claim the foregoing we have hereunto set our hands at Manitowoc, in the county of Manitowoc and State of Wisconsin.

KURT KUEHN.
OTTO RIBBECK.